(12) United States Patent
Haskin (10) Patent No.: US 8,797,247 B2
(45) Date of Patent: Aug. 5, 2014

(54) PERCEIVED DISPLAY RESOLUTION OF A COLOR ELECTRONIC MATRIX DISPLAY

(75) Inventor: Igor Haskin, Glenview, IL (US)

(73) Assignee: Motorola Solutions, Inc., Schaumburg, IL (US)

(*) Notice: Subject to any disclaimer, the term of this patent is extended or adjusted under 35 U.S.C. 154(b) by 297 days.

(21) Appl. No.: 13/108,601

(22) Filed: May 16, 2011

(65) Prior Publication Data

US 2012/0293399 A1  Nov. 22, 2012

(51) Int. Cl.
*G09G 3/36* (2006.01)
*G09G 3/20* (2006.01)
*G02F 1/1343* (2006.01)
*G02F 1/1362* (2006.01)

(52) U.S. Cl.
CPC .... *G02F 1/134309* (2013.01); *G02F 1/136286* (2013.01); *G02F 2201/52* (2013.01); *G02F 2001/134345* (2013.01)
USPC .............................................. 345/88; 345/55

(58) Field of Classification Search
None
See application file for complete search history.

(56) References Cited

U.S. PATENT DOCUMENTS

| 7,755,652 B2* | 7/2010 | Credelle et al. ............... 345/694 |
| 7,800,705 B2 | 9/2010 | Chen |
| 2004/0150777 A1* | 8/2004 | Koike .......................... 349/139 |
| 2006/0139503 A1 | 6/2006 | Larson et al. |
| 2007/0018920 A1* | 1/2007 | Jo .................................... 345/88 |
| 2008/0252581 A1* | 10/2008 | Brown Elliott et al. ........ 345/88 |
| 2010/0207858 A1 | 8/2010 | Chen |

FOREIGN PATENT DOCUMENTS

EP  2209105 A2  7/2010

OTHER PUBLICATIONS

PCT International Search Report and Written Opinion for Application No. PCT/US2012/037498 mail date Jul. 26, 2012.

* cited by examiner

*Primary Examiner* — Joseph Haley
*Assistant Examiner* — Emily Frank
(74) *Attorney, Agent, or Firm* — Barbara R. Doutre (57) ABSTRACT

A display panel (320) of an electronic matrix display (205) can have a set of pixel elements (245), a matrix of gate lines (215) and source lines (220), and a set of switches (235). Pixel elements (245) can be of at least three different colors arranged in a repeating pattern to form a matrix of horizontal and vertical rows. In each horizontal row, each pixel element (245) except those on the ends of the horizontal row has two neighboring pixel elements that are a different color than the pixel element (245) and that are a different color than each other. Each unique intersection point of the gate lines (215) and source lines (220) of the matrix can be hardwired to a set of more than one of the pixel elements (245) of the same color.

19 Claims, 7 Drawing Sheets

Conventional Implementation 282

Split-Pixel Implementation 290

Conventional Color LCD 405

Split-Pixel Color LCD 410

PERCEIVED DISPLAY RESOLUTION OF A COLOR ELECTRONIC MATRIX DISPLAY

FIELD OF THE INVENTION

The invention relates generally to electronic device displays, and more particularly to improving perceived display resolution of a color electronic matrix display.

BACKGROUND

Electronic displays, such as liquid crystal displays (LCDs) or organic light-emitting diode (OLED) displays, are a common component of many electronic devices. While such displays used to provide simple mono-chromatic block-lettered alpha-numeric text, today's electronic devices use electronic displays to present full-color graphics, images, and video. Since today's electronic displays are used to present data having a greater level of detail, the display resolution or pixel density of the display area greatly affects the clarity of the presented data and how a viewer perceives the quality of the presented data.

The perceived display quality is particularly troublesome for electronic devices that have a large display area, as opposed to those with a smaller display area with the same display resolution (i.e. a pixel count). Thus, an image displayed on a large low resolution display will appear to be grainy or have noticeable dark grid lines (i.e., low perceived resolution) than the image displayed on a smaller display with same resolution.

BRIEF SUMMARY

One embodiment of the disclosure includes a display panel of an electronic matrix display having a set of pixel elements, a matrix of gate lines and source lines, and a set of switches. Pixel elements can be of at least three different colors arranged in a repeating pattern to form a matrix of horizontal and vertical rows. In each horizontal row, each pixel element except those on the ends of the horizontal row has two neighboring pixel elements that are different colors than that pixel element and that are a different color than each other. For each unique intersection point of the gate lines and source lines of the matrix, a set of more than one of the pixel elements of the same color can be activated/deactivated as a group or cluster.

One embodiment of the disclosure includes an electronic matrix display comprising a set of gate lines and source lines intersecting the gate lines. The display also includes a set of pixel units. Each pixel unit can include at least three split-pixel subpixel units connected to a common gate line. Each of the subpixel units can be connected to a separate source line. Each of the subpixel units of the pixel unit can correspond to a different color. The display further includes a set of switches. Each gate line/source line intersection point can be hardwired to multiple different ones of the subpixel units of the same color.

One embodiment of the disclosure includes a method for producing an electronic matrix display. In the method, a display panel can be constructed for the electronic matrix display. The display panel can include a set of pixel elements of at least three different colors arranged in a repeating pattern to form a matrix of horizontal and vertical rows. In each horizontal row, each pixel element except those on the ends of the horizontal row can have two neighboring pixel elements that are a different color than that pixel element and that are a different color than each other. The display panel can also include a matrix of gate lines and source lines as well as a set of switches. At least one switch can be provided for each unique intersection point of the gate lines and source lines of the matrix. Each gate line/source line intersection point can be hardwired to a set of two or more of the pixel elements of the same color. The gate lines and source lines can be connected to a driving integrated circuit chip of a driving current unit. A backlight unit can also be connected to the display panel. The driving current unit, the display panel, and the backlight unit can be integrated into a chassis housing the electronic matrix display.

DETAILED DESCRIPTION

A grainy appearance of an electronic matrix display results in a perception of lower quality. This perception stems from the design of conventional electronic matrix displays, such as the color liquid crystal display (LCD) 105 illustrated in system 100 of FIG. 1. A typical color LCD 105 has a display area 110 divided into a plurality of elements called pixel units 125. Each pixel unit is connected to the matrix of intersecting gate lines 115 and source lines 120 and can be addressed (switched) independently.

Figure 1:
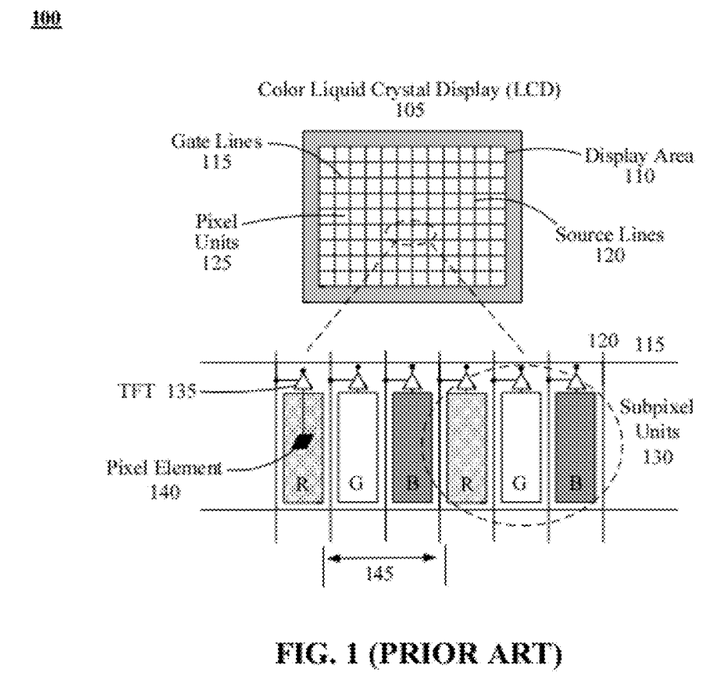
FIG. 1 (PRIOR ART) illustrates a block diagram of the pixel unit configuration of a color liquid crystal display (LCD).

In a color LCD 105, a pixel unit 125 is truly comprised of its colored subpixel units 130, one subpixel unit 130 for each color being used, red, green, and blue in this example. The light from all subpixel units 130 combine to produce white light and various combinations of the intensities of the subpixel units 130 produce other colors with the absence of light from the subpixel units 130 appearing as darkness or black light.

Each subpixel unit 130 of a row is connected to a common gate line 115, but a separate source line 120, as shown in system 100. Further, each subpixel unit 130 includes a thin film transistor (TFT) 135 that controls function of a pixel element 140 based upon the inputs received from the gate 115 and source 120 lines.

The horizontal distance 145 between subpixel units 130 of the same color affects how the human eye perceives or resolves the presented image. It is this distance 145 that causes a viewer to perceive grid lines, and, therefore, a lower resolution quality of the presented image.

Since pixel density is determined by the dimensions of the display area 110, and a total pixel count (resolution) increasing the pixel density to improve the perceived resolution of the color LCD 105 requires increasing a pixel count. A higher resolution conventional display would require a higher cost and complexity product circuit (more powerful processor, larger memory, etc.). Therefore, an approach is needed that will improve the resolution of images presented in a display area 110 while overcoming the prohibitive obstacles associated with redesign.

Embodiments of the invention address the problems associated with low perceived display resolution on a color electronic display. A split-pixel approach can be used to improve the perceived display resolution of a color electronic display, particularly one used in a small electronic device, without requiring an extensive redesign of the display and/or electronic device. By using a subpixel cluster of multiple pixel elements distributed within the space allotted for the pixel unit, the horizontal distance between pixel elements of the same color can be reduced. This reduction can be performed to an extent such that the individual pixel elements cannot be independently resolved by the human eye.

It should be emphasized that the perception of having a higher quality display is achieved without increasing a total number of effective gate lines and source lines (i.e., lines connected to a display driver or a driving current unit of an electronic matrix display). Thus, no additional processing is needed by the device that uses the electronic display. Effectively, two or more pixels of the same color are activated for each gate line/source line junction point, as opposed to a traditional approach were only one pixel is activated for each gate line/source line junction point. Thus, a significant improvement in a perceived quality of an electronic matrix display can result from the disclosed innovation, without requiring expensive modifications that would substantially increase a cost of an electronic device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
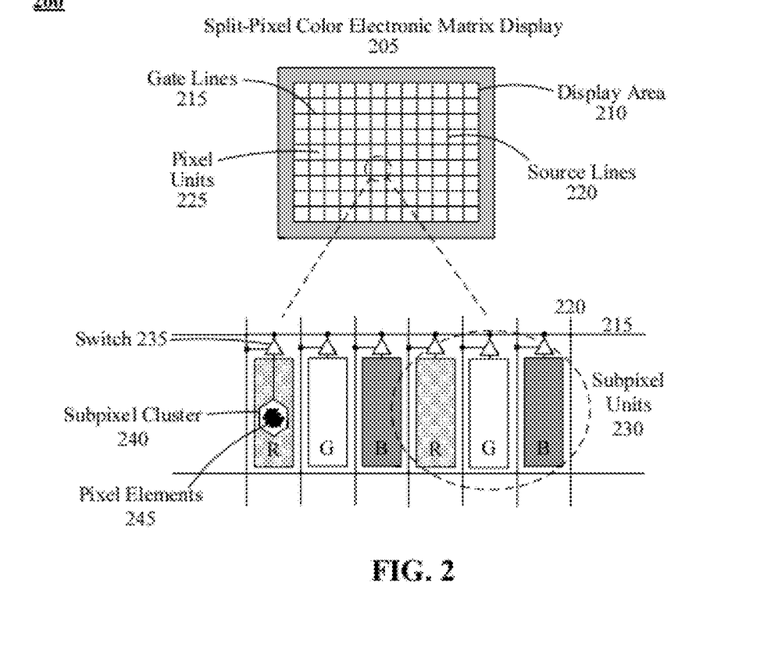
FIG. 2 is a block diagram of a system illustrating the functional components of a split-pixel color electronic matrix display in accordance with embodiments of the inventive arrangements disclosed herein.

FIG. 2 is a block diagram of a system 200 illustrating the functional components of a split-pixel color electronic matrix display 205 in accordance with embodiments of the inventive arrangements disclosed herein. As in system 100 of FIG. 1, the split-pixel color display 205 can have a display area 210 comprised of intersecting gate lines 215 and source lines 220 that create a grid of pixel units 225.

It should be noted that the use of a split-pixel color display 205 in system 200 and subsequent Figures is for illustrative purposes only, and that the split-pixel approach can be applied to other types of electronic display technologies, such as organic light-emitting diode (OLED), thick-film dielectric electroluminescent (TDEL), nano-emission display (NED), quantum dot (QD), as well as any other technologies that utilize a pixel-based display mechanism. Display 205 can be any electronic matrix display comprising a color grid, which can be selectively activated via gate lines 215 and source lines 210.

In this example, the split-pixel color display 205 can be configured to display red, green, and blue-colored light. As such, each pixel unit 225 can include a red (R), green (G), and blue (B) subpixel unit 230 connected to a common gate line 215 and the appropriate source line 220.

In other contemplated embodiments, the split-pixel color display 205 can utilize other colored light combinations, such as cyan, magenta, yellow, and black, as well combinations that use redundant colors like the RGBG or RG-BW combinations.

As in system 100, each subpixel unit 230 can include a switch 235; however, in system 200, the switch 235 can be connected to a subpixel cluster 240. The switch 235 can be a thin film transistor (TFT) or any other type of electronic component capable of functioning as a switch. Thus, when switch 235 is on a corresponding subpixel cluster 240 is on. When the switch is off, a corresponding subpixel cluster 240 is off. Each switch 235 is turned on/off based on a gate line 215 and source line 220 combination being activated/deactivated.

The subpixel cluster 240 can include multiple (e.g., two or more) pixel elements 245. Thus, switch 235 of a subpixel unit 230 used in a split-pixel color display 205 can control multiple pixel elements 245, as opposed to the TFT 135 controlling a single pixel element 140 as shown in the conventional approach of FIG. 1.

It should be emphasized that the positioning of the colored subpixel units 230 within the pixel unit 225 shown in system 200 is only to illustrate the functional components of the split-pixel color display 205 and is not necessary an actual implementation of said functional components.

Figure 2A:
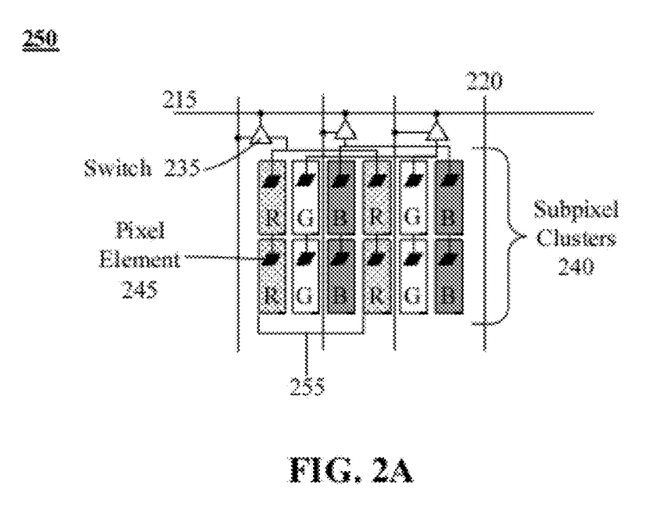
FIG. 2A illustrates a diagram of a split-pixel implementation where multiple pixel elements are associated with each switch in accordance with embodiments of the inventive arrangements disclosed herein.

For example, the pixel elements 245 of the subpixel cluster 240 can be horizontally distributed within the physical space allotted for the pixel unit 225, as shown in the schematic diagram of a split-pixel implementation 250 of FIG. 2A. In this example split-pixel implementation 250, each subpixel cluster 240 can include four pixel elements 245 arranged as two sets of two vertically-aligned pixel elements 245.

Further, implementation 250 is an embodiment where a single switch 235 is connected to multiple pixel elements 245. That is, the subpixel cluster 240 controlled by a single switch 235 can include two or more subpixel elements 245 of the same color (e.g., either red, green, or blue). The switch 235 can be hardwired to the different ones of the subpixel elements 245 (also able to be referred to as subpixel units) that it controls.

In one embodiment, each vertical set of pixel elements 245 of the same color (e.g., Red pixel elements) that are controlled by a single switch 235 can be immediately adjacent to each other vertically (e.g., no additional subpixel elements 245 of different colors separate them vertically).

Figure 2B:
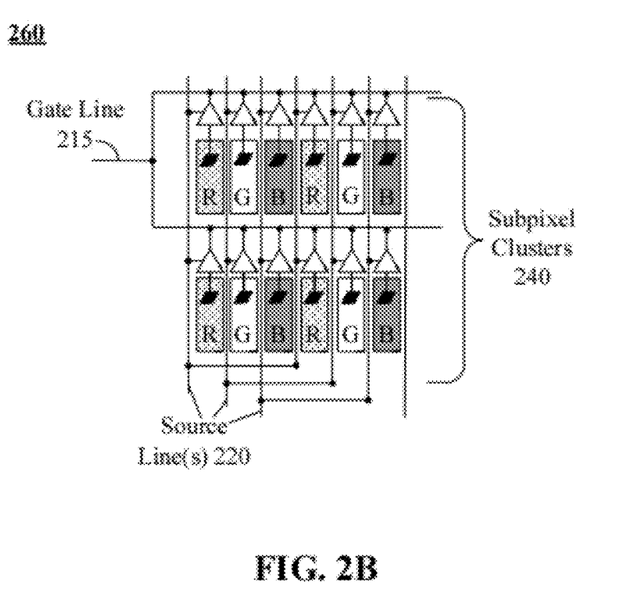
FIG. 2B illustrates a diagram of a split-pixel implementation where a single pixel elements is associated with each switch in accordance with embodiments of the inventive arrangements disclosed herein.

In one embodiment, two of the subpixel elements 245 of the same color controlled by the same switch 235 can be positioned in the same horizontal row of the matrix display 205. Each of these display elements can have immediately adjacent pixel elements 245 of a different color. When a pixel element 245 is at the end of a row of the matrix display, then only one adjacent pixel element 245 will exist. For example, a Red (R) pixel element 245 can have a Green (G) pixel element 245 adjacent to it on the right and a Blue (B) pixel element 245 adjacent to it on the left. Thus, commonly controlled Red pixel elements 245 in the same row can be separated from each other by two other pixel elements 245 (e.g., a Green and a Blue pixel element 245, as shown by implementation 250 and diagram 290).

The pixel elements 245 of each set can be connected to each other and each set can be connected to each other to create the subpixel cluster 240. The subpixel cluster 240 can then be connected to the switch 235, which, as in the conventional approach illustrated in system 100 of FIG. 1, is connected to the common gate line 215 and the specific source line 220 for that pixel unit 225. Thus, each gate line 215 and source line 220 intersection point is associated with a set of pixel elements 245 of the same color (controlled by a single switch 235 per the teachings of embodiment 250).

In another implementation, shown as embodiment 260, each pixel element 245 can be connected to a switch 235, such that a one-to-one correspondence exists between switches 235 and pixel elements 245. Multiple switches 235 can be connected to each source line 220/gate line 215 intersection point. Thus, a subpixel cluster 240 (each consisting of multiple pixel elements 245 of the same color), is connected to an intersection point of the source lines 220 and gate lines 215.

Embodiments are contemplated where each switch 235 controls more than one pixel element 245, yet where multiple switches 235 are connected to a single intersection point of source lines 220 and gate lines 215. For example, subpixel cluster 240 of four pixel elements 245 of the same color can be established; where two switches are used to control the cluster 240 of four elements (i.e., two pixel elements 245 being controlled by each switch 235).

Figure 2C:
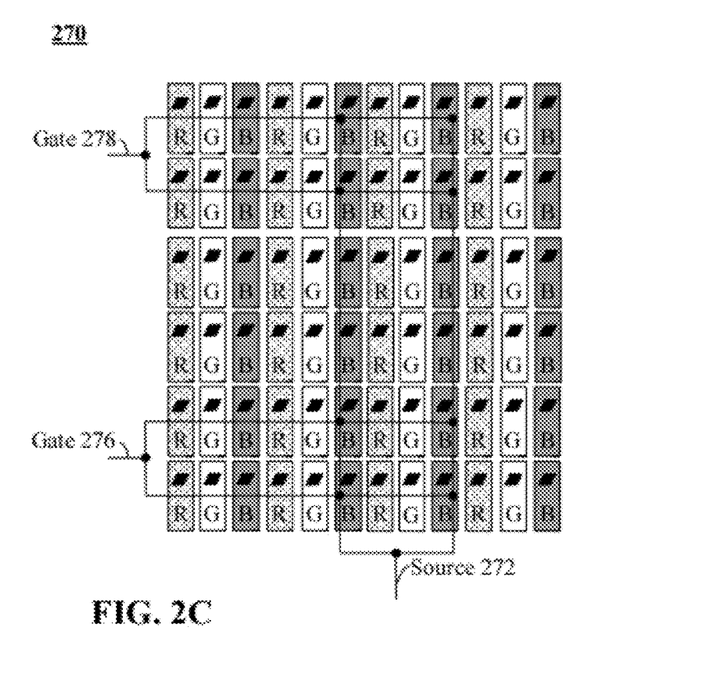
FIG. 2C illustrates a diagram of a split pixel implementation in accordance with embodiments of the inventive arrangements disclosed herein.
Figure 2D:
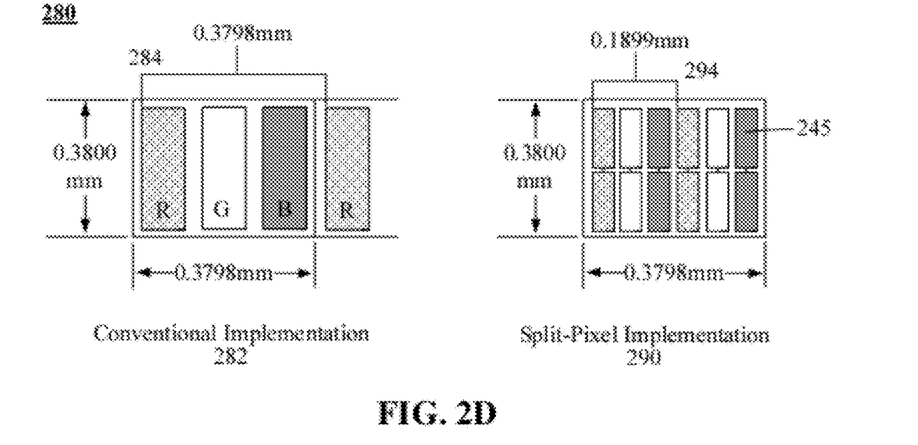
FIG. 2D is a drawing exemplifying the dimensions of a pixel unit in a conventional implementation and a split-pixel implementation in accordance with embodiments of the inventive arrangements disclosed herein.

In another example, shown by diagram 270 of FIG. 2C, red-green-blue (RGB) elements can be arranged in a larger grid, where four pixel elements 245 are associated with each intersection point of gate lines 278, 276 and source lines 272. For instance, gate line 278 and source line 272 can be connected to four blue pixel elements, as shown by diagram 270. These four blue pixels are vertically neighbors (as shown) and horizontally proximate to each other (separated by one set of R and G elements). Diagram 270 also shows a gate line 276 and source line 272 which control four different pixel elements 245.

It should be emphasized that any arrangement of multiple pixel elements per gate/source combination (or unique intersection point of gate lines and source lines) can be implemented within scope of the disclosure. For example, in one embodiment, a single gate line can be formed that combines gate lines 278 and 276. In this manner, a single gate line/source line combination can control eight pixel elements 245. Any number of pixel elements 245 can be controlled by a single source line/gate line combination.

It is important to emphasize that in the embodiments detailed above, the pixel elements 245 of the subpixel cluster 240 in the split-pixel approach are driven in the same manner as a pixel unit 125 of the conventional approach illustrated in FIG. 1 (i.e., a TFT connected to a gate and source line). This means that the split-pixel approach can utilize the same driver as the lower-resolution conventional approach, increasing the display resolution without requiring changes to the underlying driver component, without any change in a graphics processor, or any other device component.

As previously stated, the horizontal and/or vertical positioning of the pixel elements 245 and the quantity of pixel elements 245 comprising the subpixel cluster 240 shown in the example split-pixel implementation 250 is for illustrative purposes only, and, is not meant as a limitation to the present invention. The split-pixel approach described herein can be applied using different quantities and arrangements of pixel elements 245.

Further, the pixel elements 245 can be of other shapes and sizes than those expressed in the Figures. That is, the split-pixel approach can be applied to different pixel geometries (e.g., delta, stripe, diagonal, dot, etc.) as well as configurations where one or more of the subpixel units 230 are sized differently as described in U.S. Patent Application 2010/0207858A1.

The subpixel clusters 240 and/or pixel elements 245 can also include additional components or features as shown in the art, such as the secondary switch 235 described in U.S. Pat. No. 7,800,705B2 or the elongated portions described in U.S. Patent Application 2010/0207858A1.

In the example split-pixel implementation 250, the horizontal distance 255 between pixel elements 245 of the same subpixel cluster 240 can be less than the horizontal distance 145 between pixel elements 140 of subpixel units 130 of the same color, which improves the perceived quality of an image presented on the split-pixel color display 205 over the color LCD 105. That is, decreasing the horizontal distance 255 between pixel elements 245 of the same color can increase the perceived display resolution of an image by the viewer.

Horizontal and vertical distances can be specifically selected to achieve a predefined level of perceived display resolution for the electronic matrix display 205. Further, in one the entire electronic matrix display 205 need not have the same perceived display resolution (e.g., a top portion of a continuous electronic matrix display can have a greater perceived resolution than a bottom portion of the electronic matrix display; a central portion of the electronic matrix display can have a greater perceived resolution than the side regions; etc.).

Figure 4:
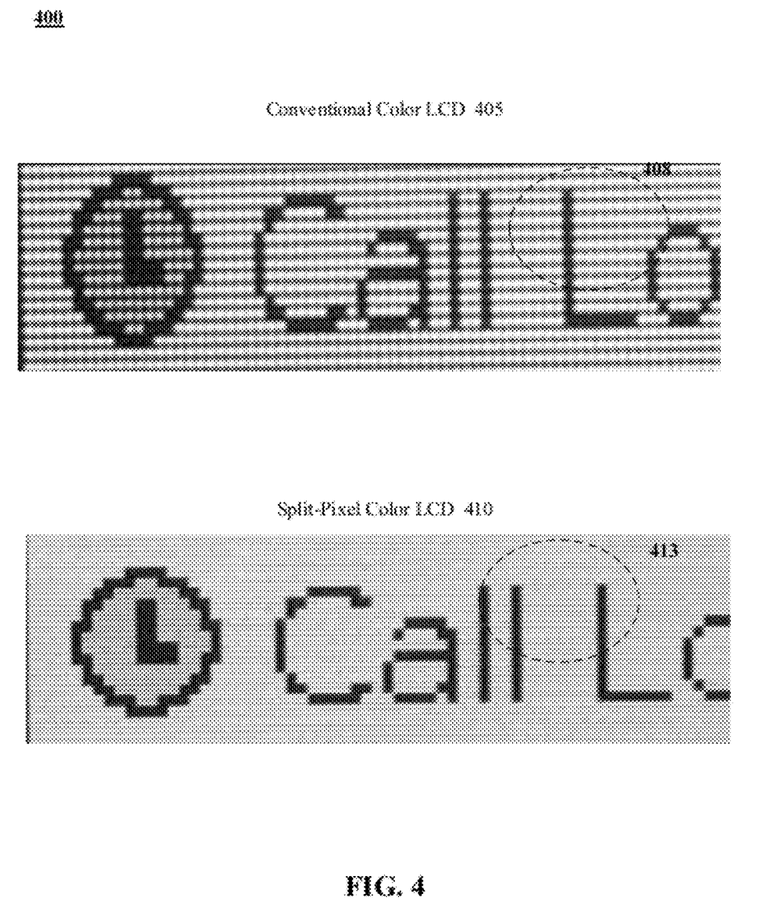
FIG. 4 is a collection of images showcasing the differences in perceived visual quality between a conventional electronic matrix implementation and a split-pixel implementation in accordance with embodiments of the inventive arrangements disclosed herein.

Thus, when determining desired levels of perceived resolution, the electronic matrix display 205 can be divided into a set of one or more spatial regions, each having a defined area. Each of these spatial regions (or areas) of the display 205 can be divided into a matrix of gate lines 215 and source lines 220. A junction point (or intersection point) of a gate line and source line can be considered a pixel unit 225, which corresponds to specific switch 235 or set of switches 235. Each pixel unit 225 (e.g., the "real" spatial region or area of the display 205 corresponding to the pixel unit) can be defined to include two or more pixel elements 245 of a common color, which may or may not have other pixel elements 245 separating them. In one embodiment, a design goal can be to define horizontally nonadjacent pixel elements of a common color (considered part of the same pixel unit 225) to be unable to be independently resolved by a viewing entity. That is, the spacing between pixel units 225 can be such that a viewer does not see discrete "dots" having a grainy appearance (see the image of diagram 405), but instead sees a more "refined" and less grainy image (see the image of diagram 410).

Figure 3:
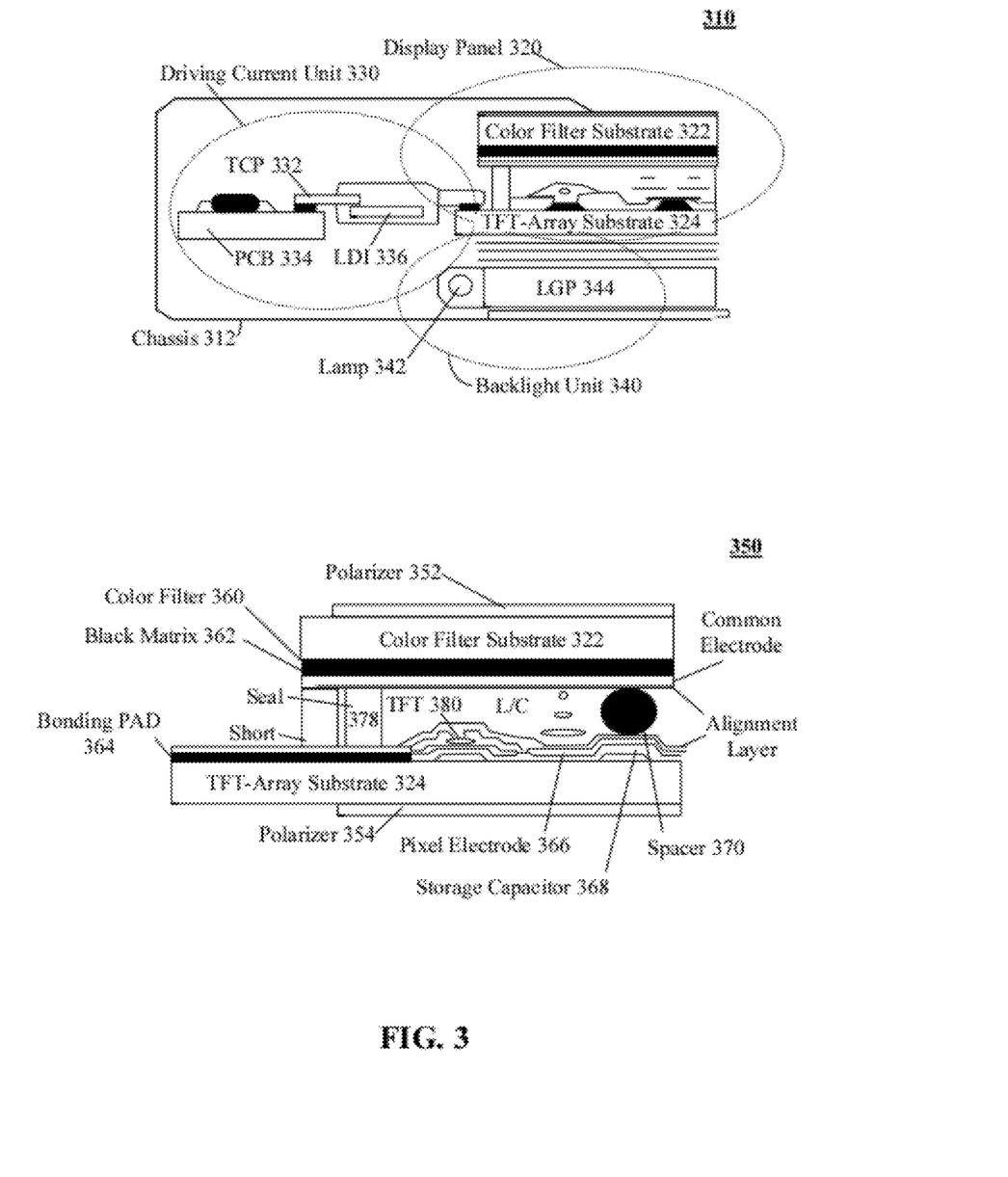
FIG. 3 shows a diagram of an electronic display in accordance with embodiments of the inventive arrangements disclosed herein.

In one embodiment, for example, a maximum quantity of subpixel units able to be handled by a driving integrated circuit (e.g., one capable of 100 by 50 pixels, for example) would result in a separation between pixel elements that produces a "grainy" image—in absence of the disclosed technique. The disclosed technique changes the visual perception of poor resolution, while not changing the actual resolution of 100 by 50 pixels, which may be the maximum resolution the driving current unit (e.g., unit 330) is able to handle. Instead, multiple pixel elements 245 are activated/deactivated for each pixel unit 225.

Thus, the a maximum horizontal separation distance and vertical distance between pixel elements 245 can be computed to achieve a desired perceived resolution, and a mapping between pixel units 225 and pixel elements 245 can be performed, such that separation between the pixel elements 245 will be less than the maximum horizontal separation distance (defined as a threshold that avoids a grainy appearance).

In other words, the horizontal distance 255 between pixel elements 245 of the same color can be directly related to how a viewer perceives a presented image based upon the typical function of the human optic system. It can be assumed that the viewer is a person having "20/20 vision", standard visual acuity, indicating that the viewer can distinguish or resolve lines separated by a visual angle of approximately one arc minute.

Using a visual angle of two arc minutes (one arc minute to each side of a central point) and basic trigonometry, the horizontal distance, herein referred to as the resolution width (RW), between pixel elements 245 at which the human eye can resolve the spacing (usually as a grid line) can be expressed as $$RW \leq D * 0.000582.$$

The variable D can represent the horizontal distance at which the person is expected to view the split-pixel color display 205 (i.e., viewing distance). The value 0.000582 represents the tangent of two arc minutes.

A simple example can illustrate use of the resolution width expression as it relates to the perceived acuity of a presented image. For the sake of example purposes, we can apply the above expression to the conventional 282 and split-pixel implementations 290 illustrated in drawing 280 of FIG. 2D. It can be assumed that the display area 210 for each implementation 282 and 290 is of an identical size and is expected to be viewed at the same viewing distance of 610 mm (~24 inches).

Both implementations 282 and 290 can utilize a pixel unit 225 having identical physical dimensions—0.3800 inches in height (vertical dimension) and 0.3798 inches in width (horizontal dimension). Using the previous expression, the resolution width for a viewing distance (D) of 610 mm can equal 0.35 mm. That is, pixel elements 245 of the same color separated by more than 0.35 mm can be independently resolved by the human eye.

The conventional implementation 282 can have a resolution width 284 of 0.3798 mm. Since 0.3798 mm is greater than the calculated resolution width of 0.35 mm, pixel elements 245 of the same color can be resolved by the human eye, resulting in the perception of the conventional implementation 282 having a lower display quality.

The split-pixel implementation 290 can have a resolution width 294 of 0.1899 mm. Since the resolution width 294 of the split-pixel implementation 290 is less than 0.35 mm, pixel elements 245 of the same color cannot be independently resolved by the human eye, resulting in the perception of greater display quality, despite the identical dimensions of both implementations 282 and 290.

In a conventional color LCD 105 like that shown in FIG. 1, decreasing the horizontal distance 145 between pixel elements 140 can mean decreasing the space between subpixel units 130, which can require changing the physical dimensions of the pixel unit 125. Ultimately, the entire display area 110 of the color LCD 105 would most likely need to be reduced in size and redesigned to account for all the changes, including the entire fabrication process. That is, a reduction in the pixel distances while maintaining the pixel count would, by necessary, result in the overall display size reduction (in absence of the innovation detailed herein), which in turn would reduce the usability/readability of the display.

The split-pixel approach can overcome these costly redesign issues by splitting and distributing the pixel elements 245 of the subpixel unit 230 into a subpixel cluster 240 within the existing physical space allotted for the pixel unit 225.

FIG. 3 shows a diagram of an electronic display in accordance with embodiments of the inventive arrangements disclosed herein. The diagrams of FIG. 3 are provided to emphasize the changes that are necessary (and not necessary) in various embodiments to implement the disclosed innovations. Specifically, diagram 310 shows an active matrix electronic display, such as a color TFT LCD panel.

Diagram 310 includes a display panel 320, a driving current unit 330, and a backlight unit 340, contained within a chassis 312. Inventive changes to implement split pixels as detailed herein can occur by making modifications to the LCD panel 330, where no significant changes need to be made to the driving current unit 330 or the backlight unit 340 when implementing split pixels as detailed herein. The driving circuit unit 330 can include a Tape Carrier Package (TCP) 332, printed circuit board (PCB) 324, an a LCD driving integrated circuit (LDI) chip 326, as shown. The backlight unit 340 includes a lamp 342 and a light guided panel 344, as shown.

The display panel 320 can include a color filter substrate 322, and a TFT array substrate 324. Diagram 350 shows a vertical structure for the display panel 320.

The TFT-Array substrate 324 contains thin film transistors (TFT) 380, storage capacitors 368, pixel electrodes 366, and interconnect wiring. The color filter substrate 332 contains the black matrix 362 and resin film containing three primary color (red, green, blue) dyes or pigments, shown as color filter 360. Each substrate 322 and 324 can be a glass substrate that is assembled with a sealant (e.g., seal 378) and a spacer 370, which maintains a gap between the substrates 322, 324. Sheets of polarized film (e.g., polarizer 352, 354) can be attached to the outer faces of the sandwich formed by the glass substrates 322, 324. Additionally, bonding pads 364 can be fabricated on each end of the gate and data-signal bus lines to attach LCD driver IC (LDI) chips 336.

The switch 235 previously described in FIG. 2 is the TFT 380 shown in the embodiment of diagram 350. The pixel elements 345 are implemented within the color filter substrate 324. The gate lines 215 and the source lines 220 are implemented within the TFT array substrate 324. The LDI chip that drives a conventional matrix display (e.g., FIG. 1) need not be modified to drive the split pixel matrix display (FIG. 2, 2A, 2B, 2C).

It should be emphasized that the embodiment of FIG. 3 is for illustrative purposes only and is not intended to be construed as a limitation of scope of the disclosure. That is, FIG. 3 (diagrams 310 and 350) provides specifics for an active matrix electronic display, which incorporates active switching elements.

In one embodiment, arrangements detailed herein can be adapted for any type of matrix display. That is, the controlling logic can control a logical matrix. The logical matrix can include a number of cells less than the number of pixel elements able to be activated in a physical matrix display.

For example, a logical matrix can be a 100 by 50 matrix, which has 5,000 individual cells that can be separately activated/deactivated by display controller logic. The physical display being controlled can be a 200 by 100 matrix, which has 20,000 individual physical cells. A mapping of multiple cells (four to one) can exist between the logical matrix and the physical matrix. Thus, each time a logical controller causes one of the 5,000 logical cells to be activated/deactivated, four of the physical pixel elements or physical cells are responsively activated/deactivated. The mapping can occur via hard wired circuitry or can be a logical mapping, e.g., software/firmware mapping that imposes a transformation between the logical matrix and the physical matrix.

FIG. 4 is a collection 400 of images 405 and 410 showcasing the differences in perceived visual quality between a conventional electronic matrix implementation and a split-pixel implementation in accordance with embodiments of the inventive arrangements disclosed herein. The images 405 and 410 of collection 400 can be generated using systems 100 and 200, respectively.

Visually comparing the image 405 presented by a color display using the conventional implementation and the image 410 presented by a color display using the split-pixel implementation, it can be said that the grid line pattern is more prominent in the outlined area 408 of the conventional color display than in the outlined area 413 of the split-pixel color display.

It should be emphasized that the two displays used to generate these images 405 and 410 are identical except for the noted pixel configurations. That is, the display area and pixel size of both color displays can be the same.

Figure 5:
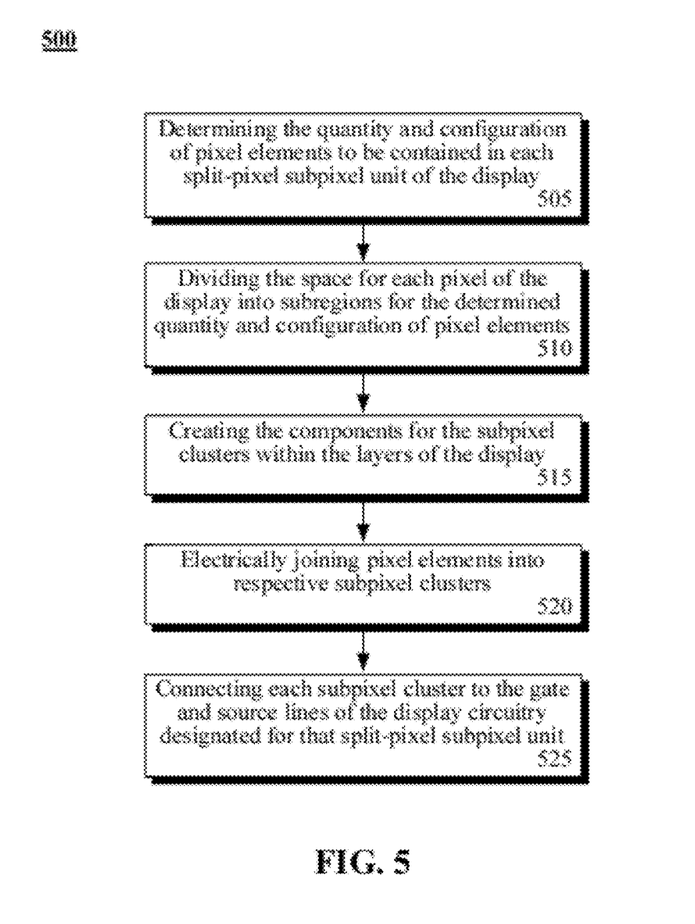
FIG. 5 is a flow chart detailing a high-level overview of the fabrication process of a split-pixel color electronic matrix display in accordance with embodiments of the inventive arrangements disclosed herein.

FIG. 5 is a flow chart of a method 500 detailing a high-level overview of the fabrication process of a split-pixel color display in accordance with embodiments of the inventive arrangements disclosed herein. Method 500 can be performed to produce the display area 210 of system 200.

Method 500 can begin in step 505 where the quantity and configuration of pixel elements for each split-pixel subpixel unit of the display can be determined. The space for each pixel of the display can be divided into subregions (also referred to as spatial regions) for the determined quantity and configuration of pixel elements in step 510.

For example, using the split-pixel implementation 250 of FIG. 2A, the pixel region can be divided to accommodate three subpixel clusters that have four pixel elements each, arranged in two horizontal rows.

In one embodiment, a maximum acceptable horizontal and vertical distance between pixel elements to achieve a desired perceptual resolution (regardless of actual resolution, which is based on pixel units handed by a driving integrated circuit of the electronic matrix display) can be determined. Then, a mapping between the pixel units of the electronic matrix display and the pixel elements can be determined, which guarantees that the maximum distance (horizontal and/or vertical) between pixel elements is not exceeded. Thus, the resulting perceptual resolution will be at least as good as a defined threshold (e.g., the maximum distance between pixel elements), which will result in a non-grainy rendering of visual content.

In step 515, the components for the subpixel clusters can be created within the layers of the display. Step 515 can be performed using standard fabrication techniques for the type of display or electronic matrix display being fabricated.

The pixel elements can then be electrically joined into their respective subpixel clusters in step 520. In step 525, each subpixel cluster can be connected to the gate and source lines of the display circuitry designated for the split-pixel subpixel unit.

This invention can be embodied in other forms without departing from the spirit or essential attributes thereof Numerous modifications and equivalent circuits will occur to those skilled in the art upon reading and understanding the teachings herein. Accordingly, reference should be made to the following claims, rather than to the foregoing specification, as indicating the scope of the invention.

Each block in the flowchart or block diagrams as provided herein may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A display panel of an electronic matrix display comprising:
    a plurality of pixel elements of at least three different colors arranged in a repeating pattern to form a matrix of horizontal and vertical rows within a pixel unit, wherein within each horizontal row each pixel element except those on the ends of the horizontal row has two neighboring pixel elements that are a different color than the pixel element and that are a different color than each other;
    a matrix of gate lines and source lines; and
    a plurality of switches for activating/deactivating the pixel elements, wherein each gate line and source line intersection point is hardwired to a plurality of different ones of the pixel elements of the same color such that one to one correspondence exists between each of the plurality of switches and each of the pixel elements and further wherein the source lines connected to the plurality of different ones of the pixel elements of the same color are paired together outside the pixel unit.

2. The display panel of claim 1, wherein activation/deactivation of each intersection point of a gate line and source line results in the activation/deactivation of a plurality of switches that correspond to the plurality of different ones of the pixel elements associated with that intersection point.

3. The display panel of claim 1, wherein the at least three different colors consist of the colors red, green, and blue, wherein each of the switches is a thin film transistor (TFT), wherein the plurality of pixel elements, the matrix of gate lines and source lines, and the switches are implemented in a liquid crystal display (LCD) panel having a color filter substrate and a TFT array substrate.

4. The display panel of claim 1, wherein connecting a plurality of different ones of the pixel elements of the same color to each gate line and source line intersection point improves a perceived resolution of the electronic matrix display compared to a perceived resolution resulting from a different display panel that connects a single pixel element of a single color to each gate line and source line intersection point, wherein the perceived resolution improvement is achieved without increasing a processing load handled by a driving integrated circuit chip connected to the source lines and the gate lines.

5. An electronic matrix display comprising:
    a plurality of gate lines;
    a plurality of source lines intersecting the plurality of gate lines;
    a plurality of pixel units, each pixel unit comprising:
        at least three split-pixel subpixel units connected to a common gate line, wherein each of the at least three split-pixel subpixel units is connected to a separate source line, wherein each of the at least three split-pixel subpixel units corresponds to a different color; and
    a plurality of switches for activating/deactivating the subpixel units, wherein each gate line and source line intersection point is hardwired to a plurality of different ones of the subpixel units of the same color such that one to one correspondence exists between each of the plurality of switches and each of the at least three split-pixel subpixel units and further wherein the source lines connected to the plurality of different ones of the subpixel units of the same color are paired together outside the pixel unit.

6. The electronic matrix display of claim 5, wherein connecting a plurality of different ones of the subpixel units of the same color to each gate line and source line intersection point improves a perceived resolution of the electronic matrix display compared to a perceived resolution resulting from an electronic matrix display that connects a single subpixel unit of a single color to each gate line and source line intersection point, wherein the perceived resolution improvement is achieved without increasing a matrix size presented to a software driver of the electronic matrix display.

7. The electronic matrix display of claim 5, wherein different colors of the subpixel units consist of the colors red, green, and blue, and wherein each of the plurality of switches are hardwired to the different ones of the subpixel units that it controls.

8. The electronic matrix display of claim 5, wherein the plurality of different ones of the subpixel units of the same color comprise at least two subpixel units of the same color of adjacent pixels within a horizontal row of the electronic matrix display.

9. The electronic matrix display of claim 5, wherein the plurality of different ones of the subpixel units of the same color comprise at least four different subpixel units, wherein said at least four different subpixel units comprise:
    at least two subpixel units of the same color of adjacent pixels within a horizontal row of the electronic matrix display; and at least two subpixel units of the same color of adjacent pixels within a vertical column of the electronic matrix display.

10. The electric matrix display of claim 5, further comprising:
a driving current unit that includes a driving integrated circuit (IC) chip to which the gate lines and source lines are connected.

11. The electronic matrix display of claim 10, wherein the driving integrated circuit (IC) chip is connected to a printed circuit board via a Tape Carrier Package (TCP).

12. The electronic matrix display of claim 10, wherein connecting a plurality of different ones of the subpixel units of the same color to each gate line and source line intersection point improves a perceived resolution of the electronic matrix display compared to a perceived resolution resulting from a different electronic matrix display that connects a single subpixel unit of a single color to each gate line and source line intersection point, wherein the perceived resolution improvement is achieved without increasing a processing load handled by a driving integrated circuit chip connected to the source lines and the gate lines.

13. The electronic matrix display of claim 5, wherein the gate lines, source lines, pixel units, and switches are components of a display panel of the electronic display that further comprises:
a driving current unit; and
a backlight unit, wherein connecting a plurality of different ones of the subpixel units of the same color to each gate line and source line intersection point improves a perceived resolution of the electronic matrix display compared to a perceived resolution resulting from a different electronic matrix display that connects a subpixel unit of a single color to each gate line and source line intersection point, wherein the perceived resolution improvement is achieved without modifying the driving current unit and without modifying the backlight unit of the second electronic matrix display.

14. The electronic matrix display of claim 5, wherein each of the switches is a thin film transistor (TFT).

15. A method for creating an electronic matrix display comprising:
constructing a display panel for the electronic matrix display comprising:
a plurality of pixel elements of at least three different colors arranged in a repeating pattern to form a matrix of horizontal and vertical rows within a pixel unit, wherein within each horizontal row each pixel element except those on the ends of the horizontal row has two neighboring pixel elements that are a different color than the pixel element and that are a different color than each other;
a matrix of gate lines and source lines; and
a plurality of switches for activating/deactivating the pixel elements, wherein each gate line and source line intersection point is associated with a plurality of different ones of the pixel elements of the same color such that one to one correspondence exists between each of the plurality of switches and each of the pixel elements and further wherein the source lines connected to the plurality of different ones of the pixel elements of the same color are paired together outside the pixel unit;
connecting the gate lines and source lines to a driving integrated circuit chip of a driving current unit;
connecting a backlight unit to the display panel; and
integrating the driving current unit, the display panel, and the backlight unit into a chassis housing the electronic matrix display.

16. The method of claim 15, wherein connecting a plurality of different ones of the pixel elements of the same color to each gate line and source line intersection point improves a perceived resolution of the electronic matrix display compared to a perceived resolution resulting from a different electronic matrix display that connects a single pixel element of a single color to each gate line and source line intersection point, wherein the perceived resolution improvement is achieved without increasing a processing load handled by a driving integrated circuit chip connected to the source lines and the gate lines.

17. The method of claim 15, wherein connecting a plurality of different ones of the pixel elements of the same color to each gate line and source line intersection point improves a perceived resolution of the electronic matrix display compared to a perceived resolution resulting from a different electronic matrix display that connects a pixel element of a single color to each gate line and source line intersection point, wherein the perceived resolution improvement is achieved without modifying the driving integrated circuit and without modifying the backlight unit from equivalent units used by the different electronic matrix display.

18. The method of claim 15, further comprising:
dividing a spatial region of the electronic matrix display into a plurality of pixel units, one pixel unit for each gate line and source line intersection point, which corresponds to a specific one of the switches, wherein the spatial region for each pixel unit is defined by a specific set of two or more of the pixel elements, such that the two horizontally nonadjacent pixel elements are unable to be independently resolved by a viewing entity.

19. The method of claim 15, further comprising:
determining an expected viewing distance of the electronic matrix display;
calculating a resolution width for the expected viewing distance, wherein said resolution width represents a maximum horizontal separation distance for pixel elements to achieve a desired perceptual resolution, wherein a maximum quantity of pixel units handled by the driving integrated circuit would result in a greater than the maximum horizontal separation distance should one pixel element correspond to one pixel unit; and
determining a plurality of different pixel elements that are to be associated with each pixel unit to assure that the horizontal separation between pixel units is less than the maximum horizontal separation distance, wherein each pixel unit corresponds to an intersection of the gate lines and the source lines.

* * * * *